Aug. 11, 1942.　　H. OSTERBERG ET AL　　2,292,966
PROJECTOR
Filed Aug. 10, 1940　　3 Sheets-Sheet 1
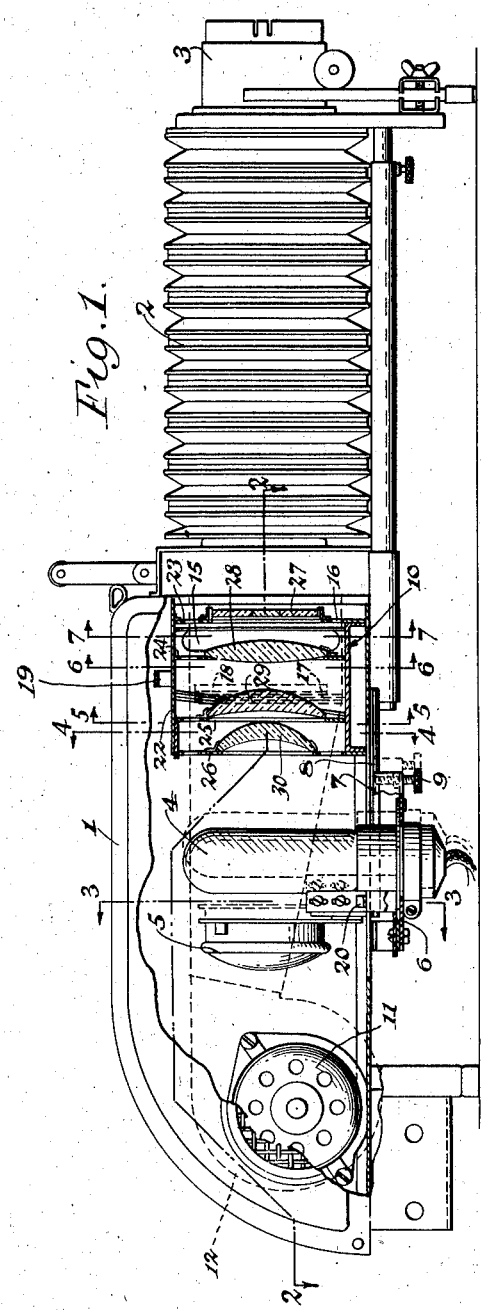
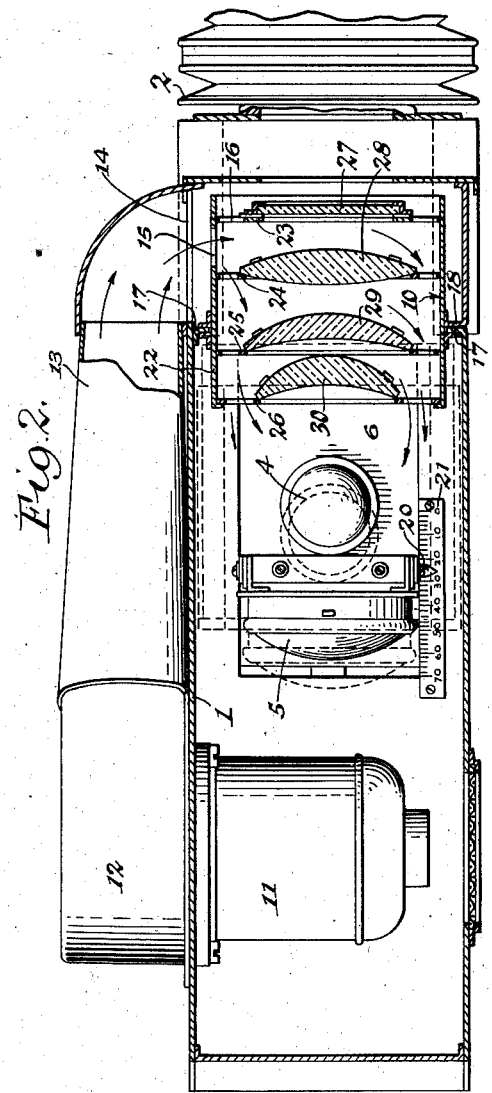
INVENTORS
HAROLD OSTERBERG
DAVID I. CRITOPH
BY
Raymond A. Paquin
ATTORNEY Aug. 11, 1942.   H. OSTERBERG ET AL   2,292,966
PROJECTOR
Filed Aug. 10, 1940   3 Sheets-Sheet 2
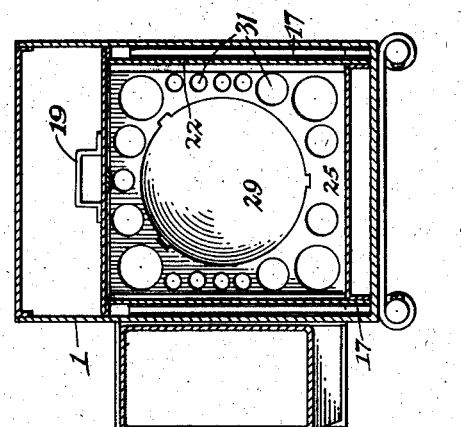
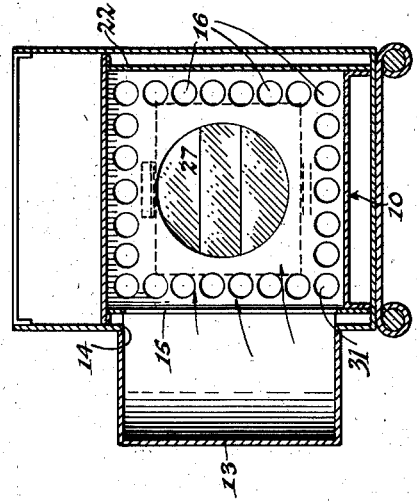
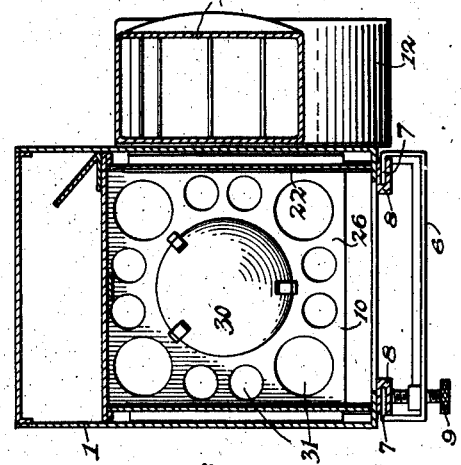
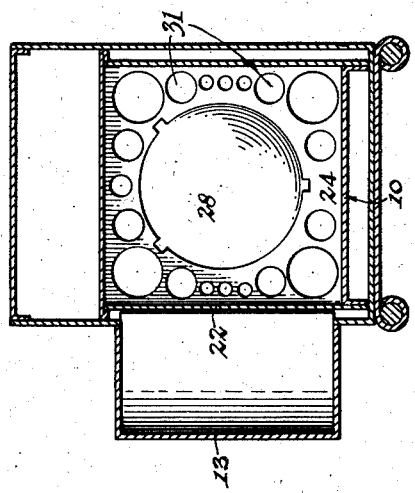
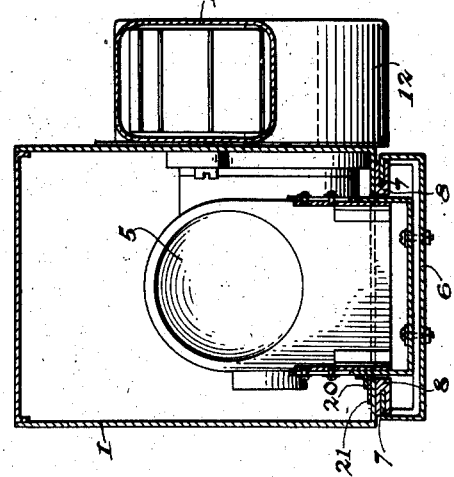
INVENTORS
HAROLD OSTERBERG
DAVID I. CRITOPH
BY
Raymond A. Paquin
ATTORNEY Aug. 11, 1942.     H. OSTERBERG ET AL     2,292,966
PROJECTOR
Filed Aug. 10, 1940     3 Sheets-Sheet 3
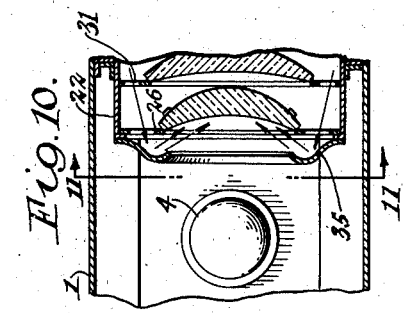
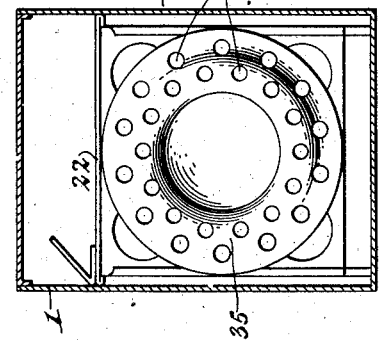
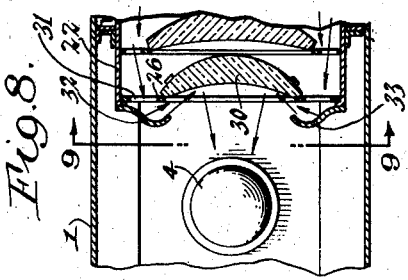
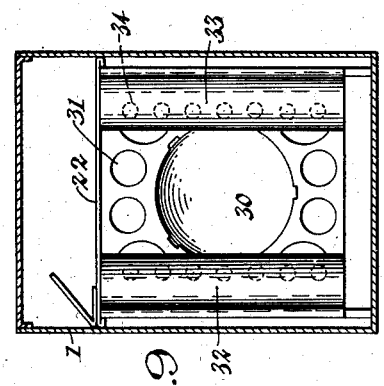
INVENTORS
*HAROLD OSTERBERG*
*DAVID I. CRITOPH*
BY
*Raymond A. Paquin*
ATTORNEY Patented Aug. 11, 1942

2,292,966

UNITED STATES PATENT OFFICE 2,292,966

PROJECTOR

Harold Osterberg and David I. Critoph, Buffalo, N. Y., assignor to Spencer Lens Company, Buffalo, N. Y., a corporation of New York Application August 10, 1940, Serial No. 352,128

7 Claims. (Cl. 88—24)

This invention relates to projectors and in particular to a new and improved ventilating arrangement therefor and to new and improved means for adjustably positioning the light and reflector means thereof.

An object of the invention is to provide a ventilating system for a projector whereby the air stream will be directed to the points desired within the projector.

Another object of this invention is to provide means for ventilating the condensing lens system of a projector.

Another object of the invention is to provide a ventilating arrangement for a projector whereby the air stream is allowed to pass through the condensing lens housing to allow circulation thereof on both sides of the lenses.

Another object of the invention is to provide a ventilating arrangement for a projector wherein the air stream is deflected also against the lens surface which faces the projection lamp as well as the other side thereof, thereby tending to keep both faces of the lens at more nearly equal temperatures and thus prevent breakage of the lens.

Another object of the invention is to provide a projector having a condenser lens unit which is removable from the projector as a unit and replaceable by other similar units.

Another object of the invention is to provide a projector with an interchangeable condenser unit which may be interchanged with other condensing units to allow projection of slides greatly varying in size.

Another object of the invention is to provide an adjustable lamp and reflector unit for a projector.

Another object of the invention is to provide an adjustable lamp and reflector unit combined with scale means, whereby the amount of adjustment of the lamp and reflector unit is indicated on the scale means.

Referring to the drawings:

Fig. 1 is a side view partly in section of a projector embodying the invention;

Fig. 2 is a partial top plan view of the projector shown in Fig. 1;

Fig. 3 is a sectional view taken on line 3—3 of Fig. 1 looking in the direction of the arrows;

Fig. 4 is a sectional view taken on line 4—4 of Fig. 1 looking in the direction of the arrows;

Fig. 5 is a sectional view taken on line 5—5 of Fig. 1 looking in the direction of the arrows;

Fig. 6 is a sectional view taken on line 6—6 of Fig. 1 looking in the direction of the arrows;

Fig. 7 is a sectional view taken on line 7—7 of Fig. 1 looking in the direction of the arrows;

Fig. 8 is a fragmentary plan view showing a modified form of the invention;

Fig. 9 is a sectional view taken on line 9—9 of Fig. 8 looking in the direction of the arrows;

Fig. 10 is a view similar to Fig. 8 but showing another modified form of the invention; and Fig. 11 is a sectional view taken on line 11—11 of Fig. 10.

Referring more particularly to the drawings in which like figures designate like parts throughout, the projector shown embodying the invention comprises a main body portion 1, an expanding bellows portion 2 and a focussing objective lens element 3.

The main casing 1 contains the lamp 4 and reflector 5 which are secured in fixed relation with each other on the plate 6, which plate is movable to move said lamp 4 and reflector 5 as a unit in said fixed adjusted relation. The plate 6 has the bent members 7 adapted to slide in grooves in the members 8 and to be locked in desired adjusted position by means of the set screw 9.

On the lamp and reflector assembly is the pointer 20 adapted to slide on the scale 21 which scale 21 is secured to the body of the projector adjacent the lamp and reflector assembly. This scale 21 is graduated in order that the lamp and reflector assembly may be adjustably positioned as desired.

The housing 1 also contains the condensing lens unit 10 and the motor 11 with the blower unit 12 and air conduit 13 adapted to force the cooling stream of air to enter the casing 1 through the opening 14 and enter the condenser lens housing through the slot 15 and through openings 16 in the front plate thereof.

The condenser lens assembly is preferably formed as a separate unit being positioned in desired adjusted relation with the remainder of the projector by means of the tongues 17 on the side walls of the projector which fit into the slots 18 formed by securing two members in spaced relation with each other on the sides of the condenser unit 10. The condenser unit 10 is formed with the handle 19 whereby the unit may be removed from or inserted into the projector. In this manner it is possible to have a series of condenser units containing lenses of different characteristics which are interchangeable in order to change the projector as desired.

It will be noted that by employing the interchangeable condenser lens unit arrangement described above by merely removing one condenser unit and replacing it with another, it is possible to use different sized slides and in fact the sizes of the slides can vary greatly; for example, from regular lantern slide size to two inch by two inch slides.

With such a construction it is not necessary to have a plurality of projectors in order to project slides of these various sizes but merely to have a plurality of condensing lens units which are interchangeable in the projector as a unit and which therefore provides an economical and easily modified projector for use with the various size slides as desired.

The condenser assembly 10 comprises the casing 22 having four partitions 23, 24, 25 and 26. The partition 23 supports the heat absorbing glass 27 which absorbs the radiant heat from the lamp 4 and thereby prevents injury to the slides being projected. The partitions 24, 25 and 26 support the condensing lens elements 28, 29 and 30.

The partitions 23, 24, 25 and 26 are each formed with their peripheries surrounding the lenses having a plurality of perforations 31 to allow the air stream forced into the projector through the conduit 13 to pass through said openings and circulate around both surfaces of the lenses 27, 28, 29 and 30 and then to pass around said lamp 4 and out of the casing through openings in its top and rear. In this way both surfaces of the lenses are cooled or ventilated and the temperatures on both surfaces are made more nearly equal, thus tending to prevent the breakage of the optical elements 27, 28, 29 and 30 as might be the case if one surface thereof was heated and the other surface cooled.

Another advantage of providing the said partitions 23, 24, 25 and 26 with perforations 31 as described above is the fact that such a construction reduces the thermal conductivity and heat capacity of said partitions and thereby reduces the danger of cracking the lenses as a result of thermal conduction.

It is also pointed out that said perforations are cut out of said partitions in a way so as not to materially impair the strength of said partitions.

In the modified form of the invention shown in Figs. 8 and 9, the condenser unit 22 has secured adjacent its vertical outer edges the deflectors 32 and 33. These deflectors 32 and 33 are so curved as to cause air coming through the openings 31 to be deflected towards the rear surface of the lens 30 so as to further equalize the temperature of this rear surface with the temperature of the front surface of the said lens 30 and then the air stream is deflected by the said rear surface of the lens 30 towards the lamp 4 as shown by the arrows in Fig. 8.

If desired a series of openings 34 may be formed in said deflectors 32 and 33 to allow some of the air to be forced directly towards the lamp 4 without being directed first towards said rear surface of the lens 30.

In the modified form of the invention shown in Figs. 10 and 11, an arrangement generally similar to that shown in Figs. 8 and 9 is illustrated except that instead of having separate deflectors 32 and 33, in the form shown in Figs. 10 and 11, a circular deflector 35 is shown surrounding the condensing lens 30. In such an arrangement a still larger portion of the air stream would first be deflected towards the rear surface of the lens 30 and then towards the lamp 4, as described in connection with Figs. 8 and 9. In this form the said deflector 35 may also be provided with a series of openings 36 to allow a portion of the air stream to be directed directly towards the lamp 4 without having first been deflected towards the rear surface of the lens 30.

From the foregoing it will be seen that we have provided simple, efficient and economical means of obtaining all of the advantages of the invention.

Having described our invention, we claim:

1. An interchangeable lens unit for a projector comprising a casing including front and rear walls and a partition in said casing, said front and rear walls and partition each supporting a lens element in optical alignment with each other, and said partition and walls having openings therethrough adjacent their periphery for ventilation of said casing and lens elements.

2. A lens unit for a projector comprising a casing including front and rear walls and a partition therein, said front and rear walls and partition being adapted to support lens elements in optical alignment with each other, said casing having an opening in one of its walls to allow the entrance of an air stream for cooling said lens elements, and said partition having openings therethrough adjacent the periphery thereof to allow the air stream to cool the other side of said lens elements.

3. A lens unit for a projector comprising a casing having front and rear walls, said walls being adapted to support optical elements in alignment with each other and having perforations therein adjacent the periphery thereof to allow the passage of air to cool said optical elements, the said rear wall having a deflector secured thereto adjacent its periphery and overlying the said openings and adapted to deflect the air passing through said openings towards the rear surface of the lens element supported by said wall.

4. A lens unit for projectors including a casing having front and rear walls and a partition therein, said walls and partition being adapted to support optical elements in optical alignment with each other, said walls and partition having openings therein adjacent the periphery thereof to allow the passage of air therethrough and one of said walls having a deflector to deflect the air passing through said openings towards the rear surface of the lens element supported by said wall.

5. A lens unit for a projector comprising a casing having front and rear walls and a plurality of partitions therein, said walls and partitions being adapted to support optical elements in alignment with each other and having perforations therethrough adjacent the periphery thereof to allow the passage of air therethrough for cooling said lens elements, one of said walls having a deflector secured on the rear thereof for deflecting the air passing through said openings towards the rear surface of the optical element supported by said wall for cooling the same, and said lens unit being removable from the projector as a unit and interchangeable with other similar units.

6. A lens unit for a projector comprising spaced walls and a partition between said walls adapted to support lens elements in substantially optical alignment with each other, one of said walls having an opening to allow the entrance of an air stream for cooling said lens elements, and said partition having vent means therethrough adjacent the periphery thereof to allow the air stream to cool the other side of said lens elements, one of said walls having a deflector secured thereto to deflect the air passing through said vent means towards the rear surface of the lens element supported by said wall.

7. A lens unit for a projector including spaced supporting members and partitions between said members, said partitions being adapted to support lens elements in substantially optical alignment with each other, one of said supporting members having means to allow the entrance of an air stream for cooling said lens elements, and said partitions each having vent means therethrough to allow the air stream to flow about both sides of the respective lens elements and cool the respective sides of said lens elements.

HAROLD OSTERBERG.
DAVID I. CRITOPH.